United States Patent
Johnson (10) Patent No.: US 11,221,024 B2
(45) Date of Patent: Jan. 11, 2022

(54) CEILING FAN BRACE ASSEMBLY

(71) Applicant: Hubbell Incorporated, Shelton, CT (US)

(72) Inventor: Steven Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/845,670

(22) Filed: Apr. 10, 2020

(65) Prior Publication Data
US 2020/0325912 A1 Oct. 15, 2020

Related U.S. Application Data

(60) Provisional application No. 62/832,060, filed on Apr. 10, 2019, provisional application No. 62/937,871, filed on Nov. 20, 2019, provisional application No. 63/001,381, filed on Mar. 29, 2020.

(51) Int. Cl.
*F04D 29/64* (2006.01)
*F16M 13/02* (2006.01)

(52) U.S. Cl.
CPC ......... *F04D 29/646* (2013.01); *F16M 13/027* (2013.01)

(58) Field of Classification Search
CPC ..... F04D 29/646; F16M 13/027; F21V 21/03; F24F 1/0047; H02G 3/081; H02G 3/10; H02G 3/125
See application file for complete search history.

(56) References Cited

U.S. PATENT DOCUMENTS

| | | |
|---|---|---|
| 1,622,087 A | 3/1924 | Calderwood |
| 1,754,849 A | 3/1925 | Clayton |
| 2,321,640 A | 1/1956 | Adkins |
| 2,732,162 A | 8/1984 | McKinley |
| 4,463,923 A | 8/1984 | Reiker |
| 4,513,994 A | 4/1985 | Dover et al. |
| 4,892,211 A | 1/1990 | Jorgensen |
| 4,909,405 A | 3/1990 | Kerr, Jr. |
| 5,044,582 A | 9/1991 | Walters |
| 5,150,868 A | 9/1992 | Kaden |
| 5,234,119 A | 8/1993 | Jorgensen et al. |
| 5,272,605 A | 12/1993 | Johnstone |
| 5,303,894 A | 4/1994 | Deschamps et al. |
| 5,393,026 A | 2/1995 | Deschamps et al. |

(Continued)

OTHER PUBLICATIONS

PCT/US2020/027674 International Search Report and Written Opinion dated Jun. 22, 2020 (13 pages).

(Continued)

*Primary Examiner* — Eret C McNichols
*Assistant Examiner* — Ding Y Tan
(74) *Attorney, Agent, or Firm* — Michael Best & Friedrich LLP (57) ABSTRACT

A ceiling fan brace includes a brace having a first segment and a second segment moveable relative to the first segment. A case is removably coupled to the brace. The case has a lower wall, an opening positioned opposite the lower wall, an inner wall extending from the lower wall away from the opening, and an internal cavity at least partially defined by the inner wall. The internal cavity is sized to receive at least one electrical conductor. A passage extends adjacent to the inner wall to receive the brace.

19 Claims, 7 Drawing Sheets

(56) References Cited

U.S. PATENT DOCUMENTS

| | | | |
|---|---|---|---|
| 5,484,076 A | 1/1996 | Petrushka | |
| 5,624,202 A | 4/1997 | Grierson | |
| 5,720,461 A * | 2/1998 | Kerr, Jr. | E04B 9/006 |
| | | | 248/317 |
| 5,954,304 A | 9/1999 | Jorgensen et al. | |
| 6,595,497 B1 | 7/2003 | Linford et al. | |
| 6,761,341 B2 | 7/2004 | Pfaller | |
| 6,889,943 B2 | 5/2005 | Dinh et al. | |
| 7,148,420 B1 | 12/2006 | Johnson et al. | |
| 7,837,172 B2 | 11/2010 | Johnson et al. | |
| 8,889,984 B2 | 11/2014 | Korcz et al. | |
| 9,285,074 B2 | 3/2016 | Korcz et al. | |
| 9,470,360 B2 | 10/2016 | Korcz et al. | |
| 9,627,867 B2 | 4/2017 | Korcz et al. | |
| 9,899,817 B2 | 2/2018 | Korcz et al. | |
| 10,008,842 B1 | 6/2018 | Baldwin et al. | |
| 10,333,288 B2 | 6/2019 | Korcz et al. | |
| 2002/0171019 A1 * | 11/2002 | Johnson | H02G 3/20 |
| | | | 248/343 |
| 2002/0179599 A1 * | 12/2002 | Dinh | F04D 25/088 |
| | | | 220/3.3 |
| 2005/0045793 A1 | 3/2005 | Johnson et al. | |
| 2005/0109907 A1 | 5/2005 | Herth | |
| 2005/0121561 A1 | 6/2005 | Sweigard | |
| 2007/0137121 A1 * | 6/2007 | Roesch | H02G 3/126 |
| | | | 52/220.1 |
| 2017/0331269 A1 * | 11/2017 | Hansen | A47B 46/005 |

OTHER PUBLICATIONS

RACO, Saddle Box Sales Drawing, Oct. 26, 2015 (1 page).
RACO, Ceiling Fan Boxes Brochure, South Bend, IN, 2012 (4 pages).
Hubbell, 4" Round Ceiling Fan-rated Support with KWIK_BRACE for New Work Brochure, Pickering, on, Jul. 2012 (1 page).

* cited by examiner

CEILING FAN BRACE ASSEMBLY

RELATED APPLICATION(S)

This application claims priority to U.S. Provisional Application Ser. No. 62/832,060, filed Apr. 10, 2019, U.S. Provisional Application Ser. No. 62/937,871, filed Nov. 20, 2019, and U.S. Provisional Application Ser. No. 63/001,381, filed Mar. 29, 2020, the disclosures of which are incorporated herein by reference in their entirety and to which priority is claimed.

BACKGROUND

The present disclosure relates to a ceiling fan brace assembly, and more specifically to a ceiling fan brace assembly configured to engage an engineered joist.

SUMMARY

Certain aspects are directed to a ceiling fan brace to couple to a ceiling joist. The ceiling fan brace includes a brace having a first segment and a second segment moveable relative to the first segment. A case is removably coupled to the brace. The case has a lower wall, an opening positioned opposite the lower wall, an inner wall extending from the lower wall away from the opening, and an internal cavity at least partially defined by the inner wall. The internal cavity is sized to receive at least one electrical conductor. A passage extends adjacent to the inner wall to receive the brace.

Certain aspects are directed to a ceiling fan brace to couple to a ceiling joist. The ceiling fan brace includes a brace having a first segment and a second segment moveable relative to the first segment. A case is removably coupled to the brace. The case has an opening, a first internal cavity extending away from the opening, a second internal cavity extending away from the opening, and a passage extending at least partially between the first and second internal cavities.

Certain aspects are directed to a method of installing a ceiling fan brace. A brace is placed between a first ceiling joist and a second ceiling joist. The length of the brace is adjusted to engage the brace with the first ceiling joist and the second ceiling joist. A case is connected to the brace. The case has a lower wall, an opening positioned opposite the lower wall, an inner wall extending from the lower wall away from the opening, and an internal cavity at least partially defined by the inner wall. An electrical conductor is positioned in the internal cavity.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a ceiling fan brace assembly for installing a ceiling fan in a finished ceiling. The ceiling fan brace assembly is configured to engage a variety of ceiling joists.

Figure 4:
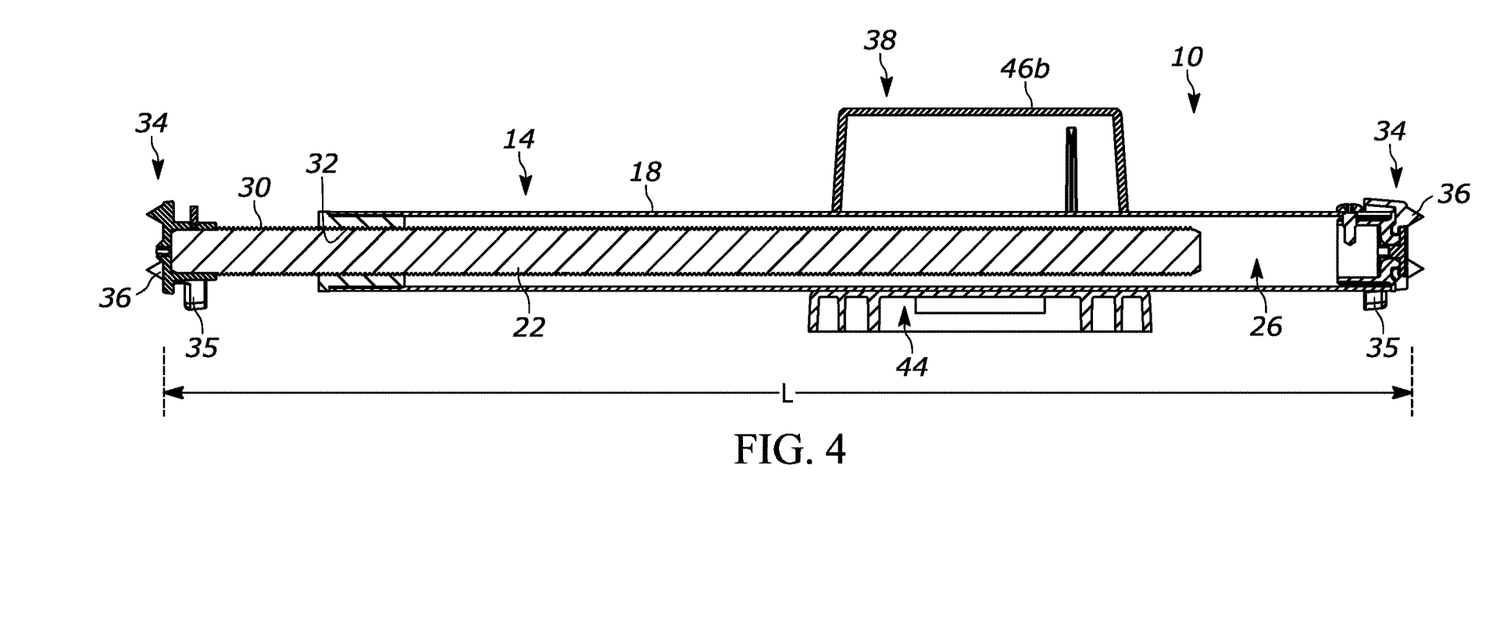
FIG. 4 is a cross-sectional view of the ceiling fan brace of FIG. 2, viewed along section 4-4.

FIGS. 1-4 illustrate an exemplary ceiling fan brace assembly 10. The ceiling fan brace assembly 10 includes a brace 14 that is an elongated member, and includes a first segment 18 and a second segment 22. The first segment 18 includes a channel 26 that receives the second segment 22. The brace 14 includes a length L that corresponds to the total length of the first segment 18 and an exposed length of the second segment 22 (e.g., a length of the second segment 18 outside of the channel 26). In the illustrated embodiment, first and second segments 18, 22 are cylindrical in shape, although in other embodiments, they may be other shapes (e.g., a rectangular prism, a triangular prism, an ellipsoid, etc.). Additionally, the second segment 22 includes a threaded section 30. As best shown in FIG. 4, the threaded section 30 mates with a corresponding threaded section 32 of the channel 26.

Supports 34 are coupled to either side of the brace 14. In the illustrated embodiment, one support 34 is coupled to the first segment 18, and another support 34 is coupled to the second segment 22. Each support 34 may be coupled via a friction fit, a fastener, or a similar means. Each support 34 includes a pair of feet 35 that extend away from the brace 14. Each support also includes prongs 36 that extend in a direction parallel to the brace 14.

The ceiling fan brace assembly 10 also includes a container or case 38. The case 38 is removably coupled to the brace 14 by at least one bracket 42. In the illustrated embodiment, the ceiling fan brace assembly 10 includes two brackets 42, although in other embodiments, any number of brackets 42 may be used. The illustrated brackets 42 have a generally U-shaped configuration with a pair of slide flanges, which allows the brackets 42 to wrap at least partially around the first segment 18.

Figure 5:
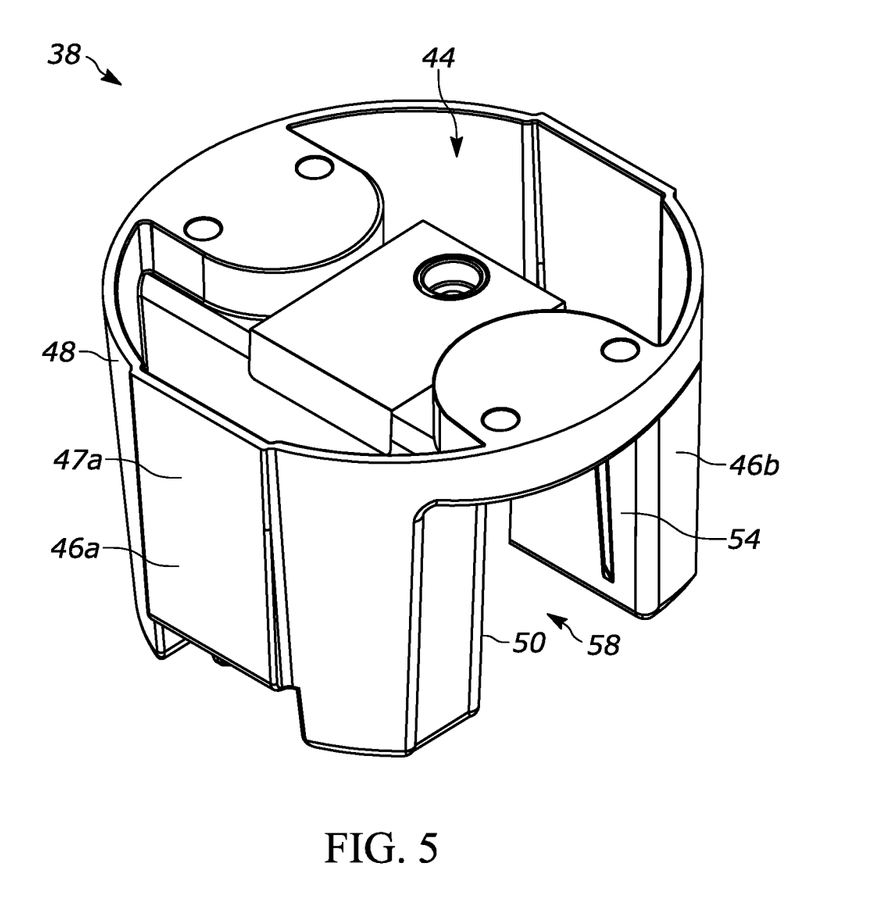
FIG. 5 is a first perspective view of a container used with the ceiling fan brace of FIG. 2.
Figure 6:
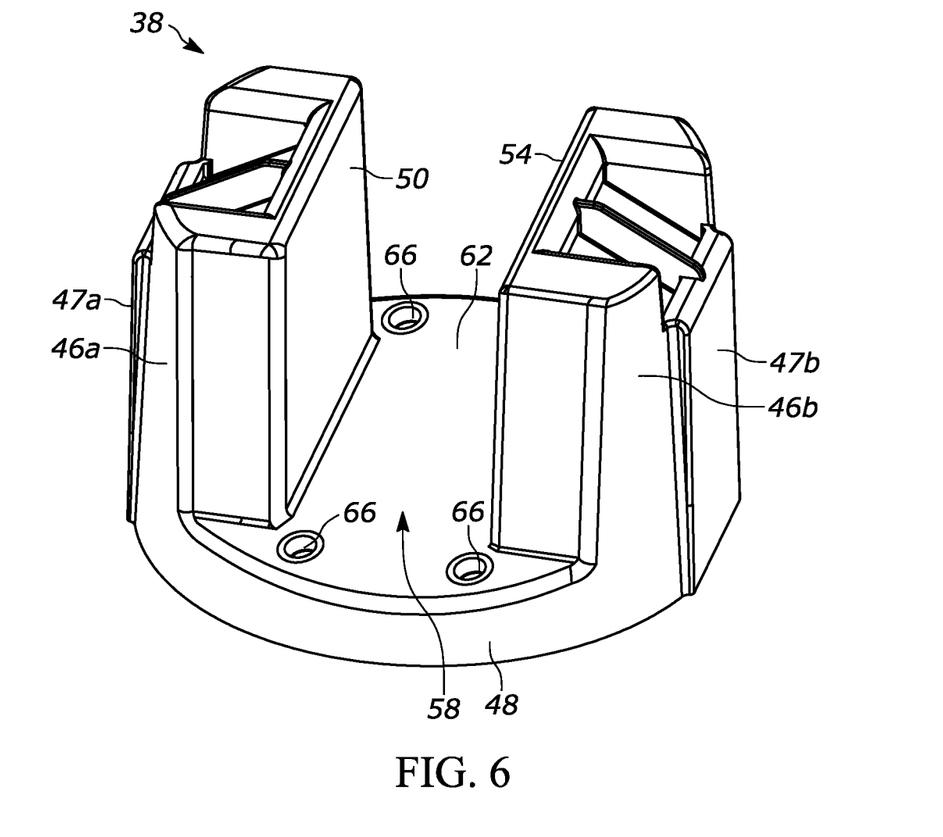
FIG. 6 is a second perspective view of the container of FIG. 5.

As shown in FIGS. 5 and 6, the case 38 includes a bottom edge defining a generally circular perimeter, although the perimeter may be other shapes (e.g., elliptical, rectangular, triangular, etc.). The bottom edge also at least partially defines one or more openings 44 in the case 38. The case 38 includes an outer wall 48 that is substantially rounded shape.

Within the opening 44, the case 38 includes at least one cavity, for example a first cavity 46a and a second cavity 46b. The first cavity 46a and the second cavity 46b define an internal volume of the case 38.

Figure 7:
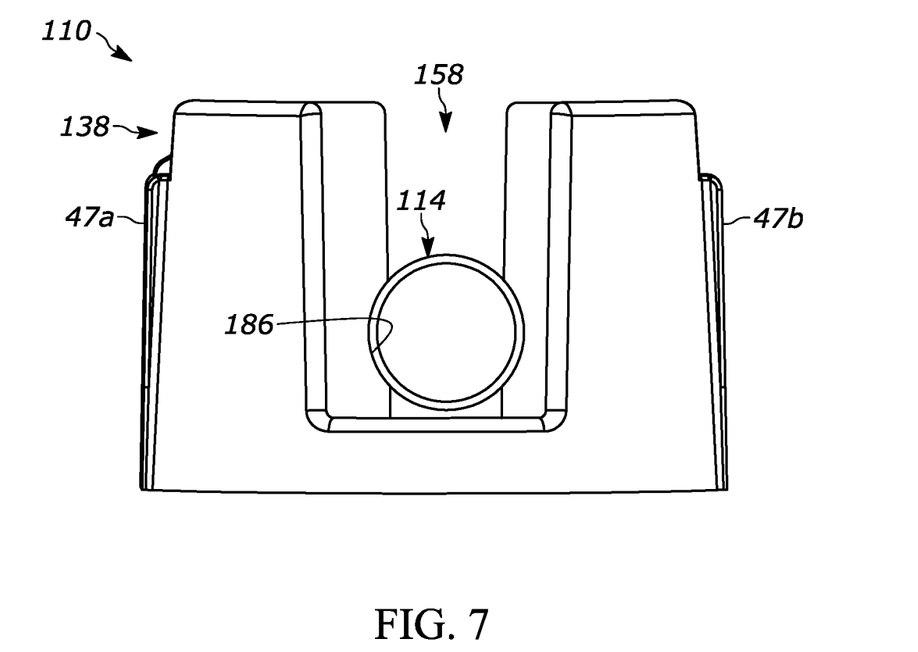
FIG. 7 is a side view of another embodiment of a ceiling fan brace.

In the illustrated embodiment, the case 38 includes a first cavity outer wall 47a, and a second cavity outer wall 47b, a first inner wall 50 and a second inner wall 54 that faces the first inner wall 50. As best shown in FIGS. 5-7, the first cavity outer wall 47a and the second cavity outer wall 47b extend outwardly from the case outer wall 48. In the illustrated embodiment, the first cavity outer wall 47a and the second cavity outer wall 47b each have a rectilinear profile extending outwardly from a curvilinear profile of the case outer wall 48. The inner walls 50, 54 are substantially straight. The inner walls 50, 54 are spaced apart and define a passage 58 that extends at least partially along the first and second inner walls 50, 54 (e.g., along a center of the case 38). Each cavity 46a, 46b is at least partially defined by the outer wall 48 and the respective inner wall 50, 54, so that the passage 58 spaces apart, and partially isolates the cavities 46a, 46b from one another. A lower inner wall 62 (see e.g., FIG. 6) is configured to rest on a support (e.g., the brace 14), while the cavities 46a, 46b are configured to extend away from the opening 44, and around the support to define a saddle shape (e.g., the first cavity 46a is a first saddle bag and the second cavity 46b is a second saddle bag). In the illustrated embodiment, the first cavity 46a is substantially identical to the second cavity 46b, and the cavities are symmetric about the passage 58. In other embodiments, one cavity 46a, 46b may be larger than the other cavity 46a, 46b. In still other embodiments (not shown), the saddle shape may be defined by only a single cavity (i.e., the case 38 includes a single cavity which would be configured to extend around one side of a support).

As shown in FIG. 6, the cavities 46a, 46b do not extend completely to the outer wall 48. The lower inner wall 62 extends at least partially around the cavities 46a, 46b. Fastening apertures 66 are disposed on the lower inner wall 62 proximate sides of the cavities 46a, 46b (e.g., the fastening apertures 66 are disposed outside of the passage 58). The fastening apertures 66 are configured to receive fasteners 70 in order to couple the brackets 42 to the case 38.

Figure 1:
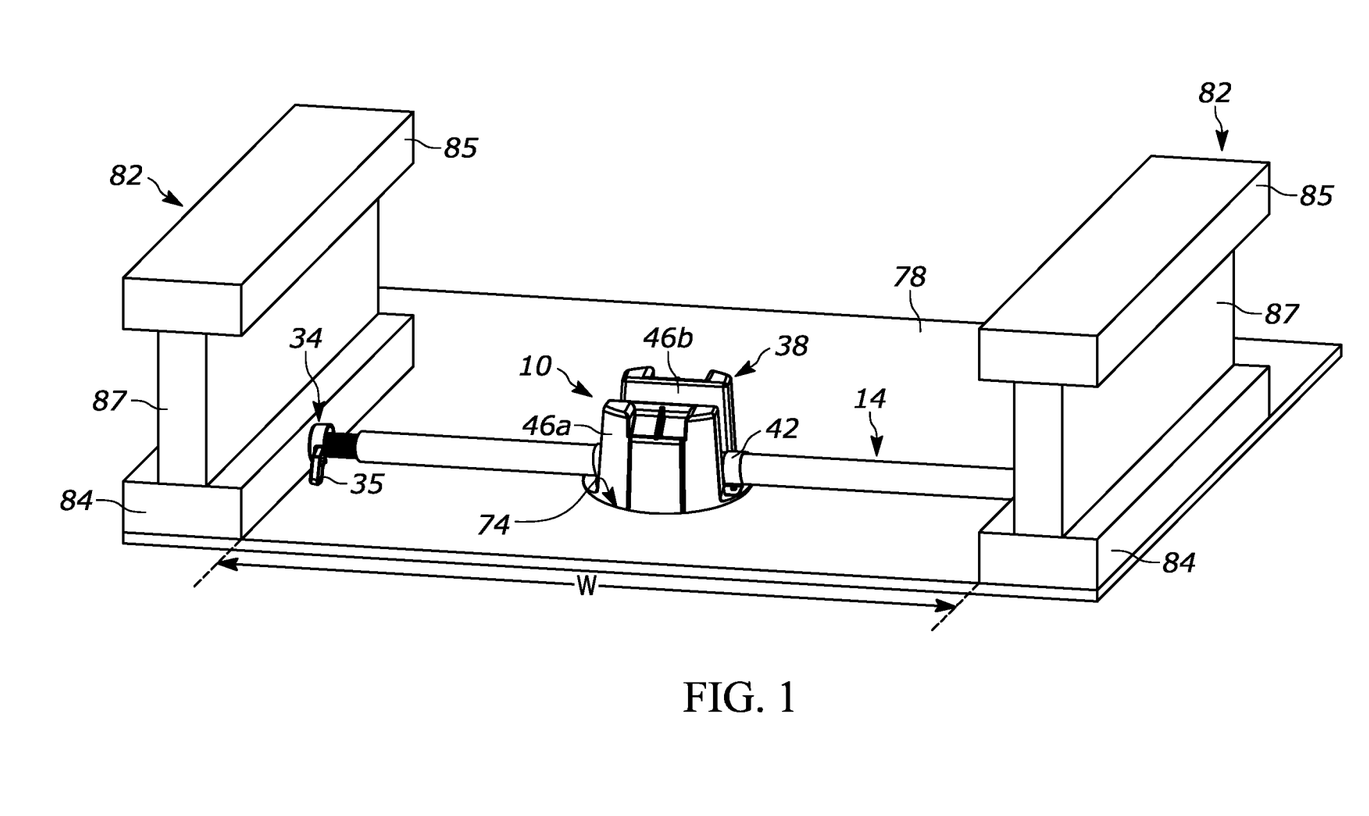
FIG. 1 is a perspective view of a ceiling fan brace mounted in a ceiling.
Figure 2:
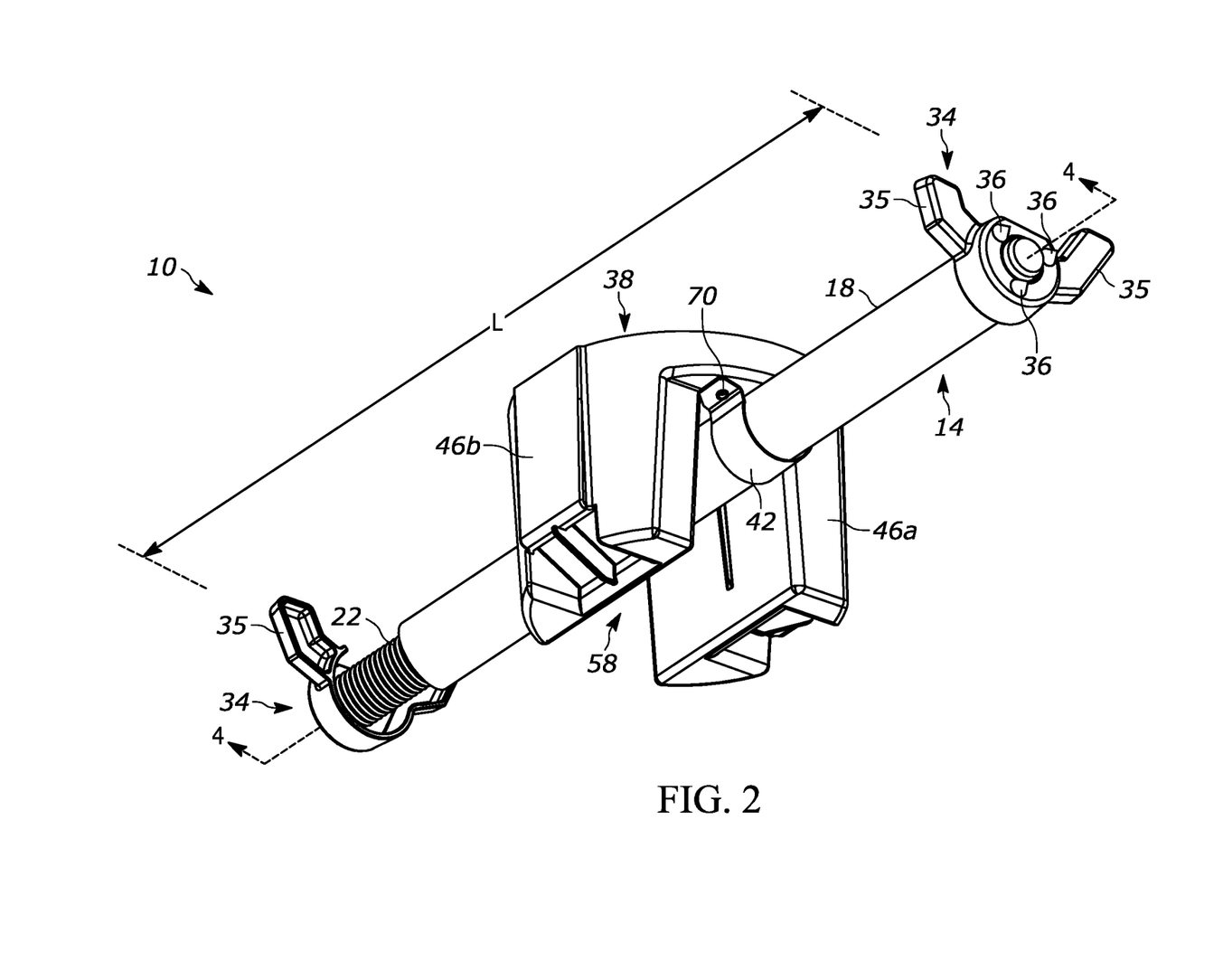
FIG. 2 is a perspective view of the ceiling fan brace of FIG. 1.
Figure 3:
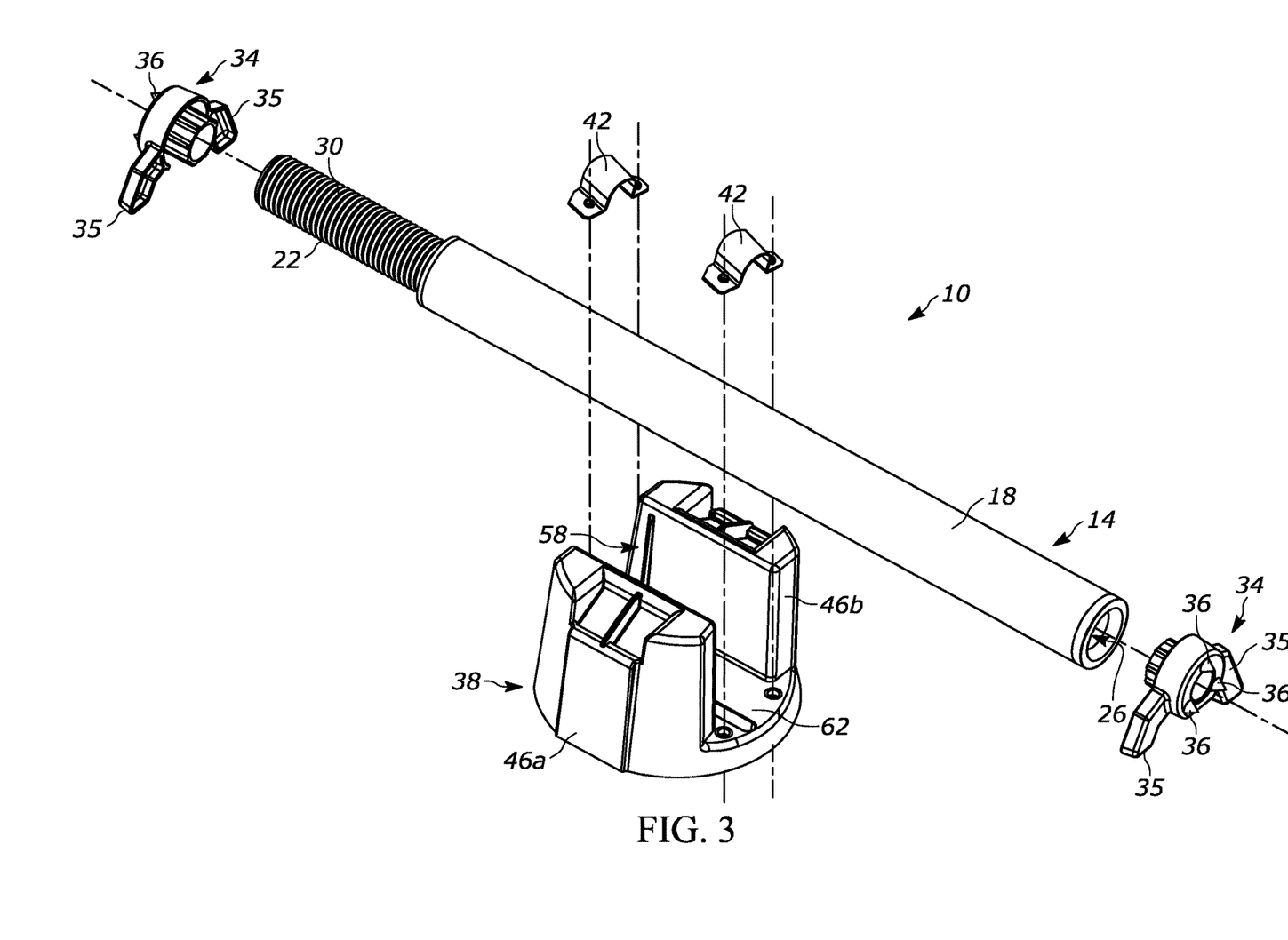
FIG. 3 is an exploded view of the ceiling fan brace of FIG. 2.

To install the ceiling fan brace assembly 10, a user first cuts a hole 74 (FIG. 1) in an existing ceiling 78 (e.g., using a hole saw). In some embodiments, the hole 74 may be a four inch hole, although the hole 74 may also be larger or smaller. As shown in FIG. 1, a pair of joists 82 are spaced apart from each other within the ceiling 78 and define a width W. In the illustrated embodiment, the joists 82 are engineering joists (i.e., I-beams). The joists 82 include a lower cord 84 and an upper cord (not shown) that each have a greater width than a center portion 85 of the joist 82.

The length L of the brace 14 is adjusted based on the width W. As shown in FIG. 4, by rotating the first segment 18 relative to the second segment 22 in a first direction (e.g., clockwise), the threaded sections 30, 32 allow the second segment 22 to move into or out of the cavity 26 while remaining coupled to the first segment 18. A user rotates the segment 18 relative to the second segment 22 such that the length L is less than the width W (i.e., the length of the brace 14 is less than the width between the joists 82). The brace 14 is then inserted through the hole 74 (see e.g., FIG. 1) and repositioned so that the brace 14 partially extends between the joists 82 (i.e., along the width W). The first segment 18 is then rotated in a second direction opposite the first direction (e.g., counterclockwise) relative to the second segment 22 in order to increase the length L substantially to the width W.

When the length L and width W are substantially equal, the feet 35 of the supports 34 rest against the ceiling 78 and are positioned adjacent the lower cord 84 of each respective joist 82. The prongs 36 one each support 34 are positioned proximate each respective joist 82, but do not engage the lower cords 84. The length L is then further increased (i.e., by rotating the first segment in the second direction) to that the prongs 36 of the supports engage (e.g., dig into) the lower cords 84, thereby fixing the brace 14 to the joists 82.

Once the brace 14 is fixed, the user positions the brackets 42 around the brace 14 (e.g., around the first segment 18) such that the force of gravity retains the brackets 42 against the brace 14. The case 38 is then positioned through the hole 74 such that the cavities 46a, 46b extend around the brace 14 and into the ceiling 78. The brace 14 is positioned within the passage 58. The brackets 42 rest against the lower inner wall 62 proximate the fastening apertures 66, and fasteners 70 are coupled to the case 38 and the brackets 42 in order to secure the case 38 to the brace 14 within the hole 74. A ceiling fan (not shown) may then be mounted to the ceiling 78, and the electrical cables of the ceiling fan may be stored in the cavities 46a, 46b.

The case 38 provides additional storage volume within the cavities 46a, 46b that can be used to store electrical wires or other components as compared to a pan case (i.e., a case 38 lacking the cavities 46a, 46b). This is useful, particularly when working with engineering joists 82. The lower cord 84 of the joists is disposed proximate the ceiling 78 (e.g., a half inch from the ceiling), and therefore the brace 14 is positioned proximate the ceiling 78. Having the cavities 46a, 46b extend around and beyond the brace 14 enables the case 38 to fit in the reduced clearance between the brace 14 and the ceiling 78, while also providing sufficient volume to store the electrical cables.

As shown in FIG. 7, an alternate embodiment of a ceiling fan brace assembly 100 may include a case 138 (e.g., a saddle shaped case) with a passage 158 having a groove 186. The groove 186 is configured to receive a brace 114 in a snap-fit arrangement so that brackets and fasteners are not required to couple the case 138 to the brace 114. This allows for easier assembly and disassembly then having to tighten and untighten fasteners.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A ceiling fan brace to couple to a ceiling joist, the ceiling fan brace comprising:
   a brace including a first segment and a second segment moveable relative to the first segment; and
   a case removably coupled to the brace, the case having a lower wall, an opening positioned opposite the lower wall and at least partially defined by a case outer wall, an inner wall extending from the lower wall away from the opening, a cavity outer wall extending outwardly from the case outer wall relative to the inner wall, and an internal cavity at least partially defined by the inner wall and the cavity outer wall,
   wherein the internal cavity is sized to receive more than one electrical conductor, and wherein a passage extends adjacent to the inner wall to receive the brace.

2. The ceiling fan brace of claim 1, further comprising a bracket for coupling the case to the brace.

3. The ceiling fan brace of claim 1, wherein the first segment includes a first threaded section and the second segment includes a second threaded section, the first threaded section mating with the second threaded section.

4. The ceiling fan brace of claim 1, wherein the brace further includes a support coupled to one of the first segment and the second segment, the support includes a prong configured to engage a ceiling joist.

5. The ceiling fan brace of claim 1, wherein the internal cavity is a first internal cavity and wherein the case includes a second internal cavity extending away from the opening.

6. The ceiling fan brace of claim 5, wherein the first internal cavity is substantially identical to the second internal cavity.

7. The ceiling fan brace of claim 5, wherein the first and second internal cavities are configured to extend around a portion of the brace.

8. The ceiling fan brace of claim 5, wherein the first internal cavity, the second internal cavity, and the passage have a saddle-shape configuration.

9. The ceiling fan brace of claim 1, wherein the passage includes a groove that is configured to engage the brace in a snap-fit arrangement.

10. A ceiling fan brace to couple to a ceiling joist, the ceiling fan brace comprising:
a brace including a first segment and a second segment moveable relative to the first segment; and
a case removably coupled to the brace, the case having an opening, a case outer wall, a first internal cavity extending away from the opening, a second internal cavity extending away from the opening, and a passage extending at least partially between the first and second internal cavities,
wherein the first internal cavity is at least partially defined by a first cavity outer wall extending from the case outer wall and the second internal cavity is at least partially defined by a second cavity outer wall extending from the case outer wall in a direction opposite the first cavity outer wall.

11. The ceiling fan brace of claim 10, wherein the case includes a lower wall, and wherein the brace is configured to rest against the lower wall.

12. The ceiling fan brace of claim 10, wherein the brace further includes a support having a prong, the support configured to rest against a surface of a ceiling while the prong engages a ceiling joist.

13. The ceiling fan brace of claim 10, wherein the brace further includes first segment and a second segment moveable relative to the first segment.

14. The ceiling fan brace of claim 10, wherein the passage includes a groove that is configured to engage the brace in a snap-fit arrangement.

15. The ceiling fan brace of claim 10, wherein the first internal cavity, the second internal cavity, and the passage have a saddle-shape configuration.

16. The ceiling fan brace of claim 10, wherein the passage is configured to receive the brace, and the first and second internal cavities are configured to extend around a portion of the brace.

17. The ceiling fan brace of claim 10, wherein the first internal cavity is defined by an inner wall and an outer wall, and wherein the inner wall is adjacent the passage.

18. The ceiling fan brace of claim 1, wherein the case outer wall has a curvilinear profile and the cavity outer wall has a rectilinear profile extending from the curvilinear profile.

19. The ceiling fan brace of claim 10, wherein the case outer wall has a curvilinear profile and the first cavity outer wall and the second cavity outer wall have a rectilinear profile extending from the curvilinear profile.

* * * * *